United States Patent
Baldassini et al.

(10) Patent No.: US 7,917,122 B2
(45) Date of Patent: Mar. 29, 2011

(54) METHOD FOR SENDING A SHORT MESSAGE AND DEBITING THE RECIPIENT

(75) Inventors: Tony Baldassini, Milan (IT); Massimo Malcontenti, Milan (IT)

(73) Assignee: Tim Italia S.p.A., Milan (IT)

( * ) Notice: Subject to any disclaimer, the term of this patent is extended or adjusted under 35 U.S.C. 154(b) by 0 days.

(21) Appl. No.: 10/536,004

(22) PCT Filed: Nov. 24, 2003

(86) PCT No.: PCT/EP03/13195
§ 371 (c)(1),
(2), (4) Date: May 20, 2005

(87) PCT Pub. No.: WO2004/049690
PCT Pub. Date: Jun. 10, 2004

(65) Prior Publication Data
US 2006/0128403 A1    Jun. 15, 2006

(30) Foreign Application Priority Data
Nov. 22, 2002   (IT) ................. RM02A0590

(51) Int. Cl.
*H04M 11/00*    (2006.01)
*H04W 4/00*     (2009.01)
(52) U.S. Cl. ...................................... 455/406; 455/466
(58) Field of Classification Search .................. 455/466, 455/412.2, 406, 403, 408
See application file for complete search history.

(56) References Cited

U.S. PATENT DOCUMENTS

| | | | | |
|---|---|---|---|---|
| 5,835,856 A | * | 11/1998 | Patel | 455/406 |
| 5,878,397 A | * | 3/1999 | Stille et al. | 455/466 |
| 5,915,222 A | * | 6/1999 | Olsson et al. | 455/466 |
| 6,081,703 A | * | 6/2000 | Hallqvist | 455/466 |
| 6,473,622 B1 | * | 10/2002 | Meuronen | 455/466 |
| 6,480,710 B1 | * | 11/2002 | Laybourn et al. | 455/406 |
| 7,039,390 B1 | * | 5/2006 | Hohne et al. | 455/406 |
| 2002/0029189 A1 | * | 3/2002 | Titus et al. | 705/39 |
| 2003/0050042 A1 | * | 3/2003 | Olah | 455/406 |
| 2003/0143977 A1 | * | 7/2003 | Mittal | 455/406 |

(Continued)

FOREIGN PATENT DOCUMENTS
JP    11-136400    5/1999
(Continued)

OTHER PUBLICATIONS

Taylor, "The GSM Short Message Service"; Pan-European Mobile Communications, Issue 15, pp. 72-75, (1993).

(Continued)

*Primary Examiner* — Patrick N Edouard
*Assistant Examiner* — Huy C Ho
(74) *Attorney, Agent, or Firm* — Finnegan, Henderson, Farabow, Garrett & Dunner, L.L.P.

(57) ABSTRACT

A method for sending short messages using a debiting service with debiting to a recipient by the following steps: 1) receiving a short message from a sending number addressed to a recipient's number, with the addition of a prefix, the prefix being associated with the debiting service; ii) checking an authorization of the sending number to debit a cost of the short message to the recipient; iii) checking if a credit of the recipient is greater than the cost; and iv) if outcomes of both checks ii and iii are positive, sending the short message to the recipient.

9 Claims, 1 Drawing Sheet

U.S. PATENT DOCUMENTS

| | | | |
|---|---|---|---|
| 2004/0043777 A1* | 3/2004 | Brouwer et al. | 455/466 |
| 2004/0063445 A1* | 4/2004 | Vaananen | 455/466 |
| 2005/0181759 A1* | 8/2005 | Hundscheidt et al. | 455/408 |
| 2005/0197111 A1* | 9/2005 | Alanara et al. | 455/418 |

FOREIGN PATENT DOCUMENTS

| | | | |
|---|---|---|---|
| JP | 2001-309088 | | 11/2001 |
| JP | 2002-152425 | | 5/2002 |
| WO | WO 01/22761 | * | 3/2001 |
| WO | WO 01/22761 A1 | | 3/2001 |
| WO | WO 01/37537 A1 | * | 5/2001 |

OTHER PUBLICATIONS

Dittrich et al.; "Implementation of the GSM-Data-Services Into the Mobile Radio System"; MRC Mobile Radio Conference of Nov. 13-15, 1991, pp. 73-83, (1991).

English translation of the Japanese Patent Office action for Japanese patent application No. 554447-2004, issued on Oct. 23, 2008, dispatched on Oct. 29, 2008.

English language machine translation of Japanese Publication No. JP 2001-309088 A, dated Nov. 2, 2001, obtained from the Japan Patent Office (JPO) Industrial Property Digital Library available through the JPO web site http://www.jpo.go.jp/index.htm.

* cited by examiner

METHOD FOR SENDING A SHORT MESSAGE AND DEBITING THE RECIPIENT

CROSS REFERENCE TO RELATED APPLICATIONS

This application is a national phase application based on PCT/EP2003/013195, filed Nov. 24, 2003, which claims the priority of Italian Application No. RM2002A000590, filed Nov. 22, 2002, the content of both of which is incorporated herein by reference.

BACKGROUND OF THE INVENTION

1. Technical Field

The invention relates in general to the field of mobile telephony, and more particularly to short message services (SMS) and the corresponding billing processes.

2. Prior Art

Telephone services which enable a call to be debited to the called party are known; after the call request, if the called party consents to the debiting, the connection is established and the call can take place.

However, at the present time there is only provision for billing the senders of short messages. Clearly, the problems of billing the recipient of a message are fundamentally different from those of voice calls, and in particular the different nature of the information content and the corresponding transmission protocol require ad hoc solutions which are totally unrelated to the existing procedures for managing voice calls debited to the called party.

The object of the present invention is to enable short messages to be sent with the cost debited to the recipient, this debiting to the recipient being allowed only if the latter has previously authorized the sending number for the operation.

Another object of the present invention is to provide a method for sending short messages with debiting to the recipient which enables both the recipient's number and the data for the type of billing to the recipient to be sent together with the message.

Finally, another object of the present invention is to provide a method for sending short messages with debiting to the recipient which is based on the typical network architecture of SMS management systems and which uses communication protocols which are standard in the mobile telephony field, in order to make the service inexpensive and immediately usable.

SUMMARY OF THE INVENTION

These and other objects which will be made clear in the description are achieved by means of a method comprising the following steps.
1. A user wishing to debit the cost of a short message to the recipient of the message provides the number with a prefix, e.g. consisting of a short number, associated with a platform managing the service. For example, if the recipient's number is 3351234567 and the short number is 4888, the user may dial 48883351234567.
2. When it receives the message, the SMS center SMS-C forwards the same to the platform managing the service, keeping the data relating to the recipient number (prefix+number) unchanged.
3. The platform managing the service checks that the recipient of the message has authorized the sending number to debit the cost of the short message to him.
4. The platform also checks, via a suitable interface with the billing systems, that the recipient has sufficient credit for the operation to take place.
5. If the outcome of both checks is positive, the platform sends the message to the recipient.
6. If the authorization check is negative, a courtesy message may be sent to the sender, informing him that sending with debiting to the recipient is not possible. The recipient may also be informed of the sender's attempt to debit him, and of the procedures for activating the system.

BRIEF DESCRIPTION OF THE DRAWING

In order to provide an example of how the service can be implemented, without intent to limit the generality of the invention and its possible fields of application, a specific embodiment of the invention is described below with particular reference to FIG. 1 attached.

This FIGURE shows the following message flow:

Figure 1:
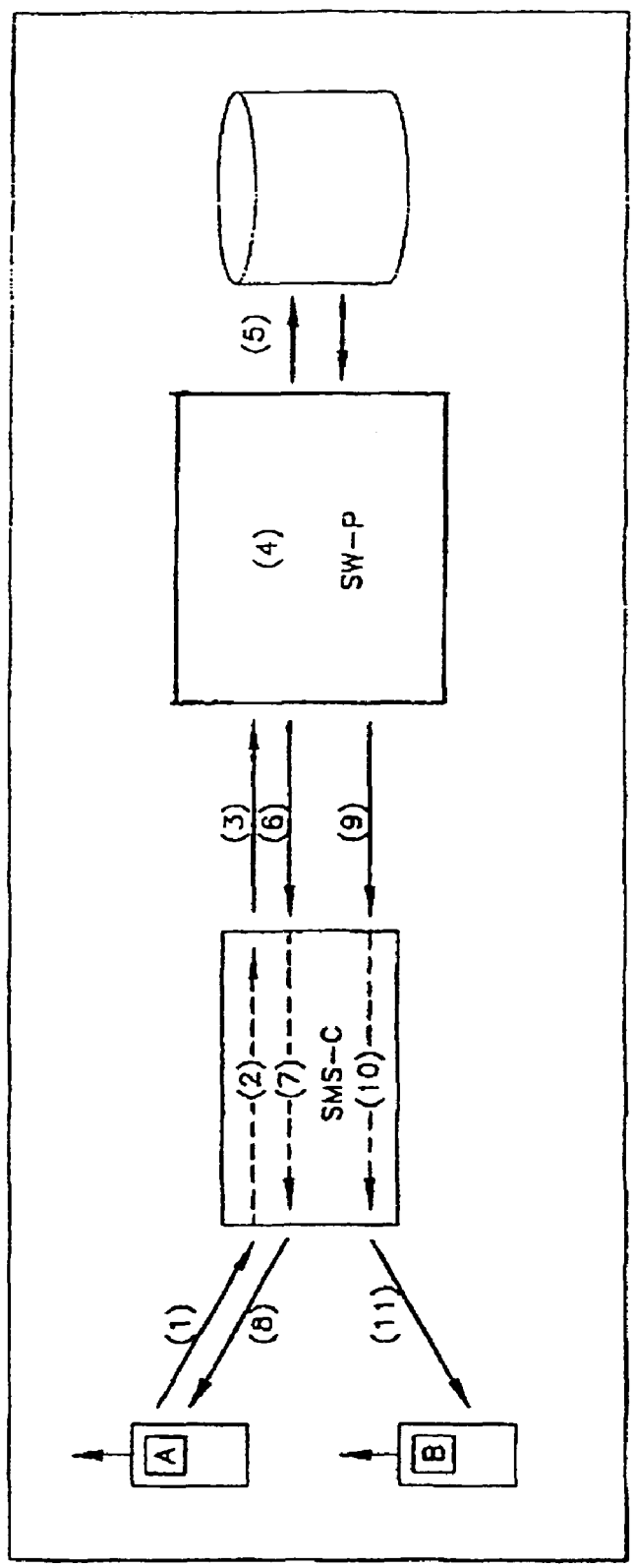

DETAILED DESCRIPTION OF THE INVENTION (1) User A sends the SMS with debiting to the recipient, by adding a suitable prefix to the recipient's number.
(2), (3) The SMS-C receives the message, recognizes from the prefix that the SMS message should be debited to the recipient and forwards the same to the software platform SW-P, instead that sending directly to the recipient.
(4) The SW-P platform eliminates the prefix from the recipient's number, in order to recognize the user B to which the message has to be sent, and checks the authorizations set by user B.
(5) The SW-P platform checks the credit of user B.
(6), (7), (8) If user A is not authorized for the debiting or user B has insufficient credit, user A receives the courtesy message.
(9), (10), (11) If user A is authorized for the debiting and user B has sufficient credit, the SW-P platform forwards the short message to the SMS-C, so that it can be sent to user B.

For user B, the fact that he is being billed is transparent because the received message shows the number of user A as the sender, as for a normal short message.

However, the sent message does not go directly to the recipient but is processed by the dedicated SW-P platform. The forwarding of the messages from the SMS-C and the SW-P platform (and vice-versa) can be carried out by a protocol of the IP suite, such as for example by UCP (Universal Computer Protocol).

Since the system evaluates the incoming message as originating from an application if it is identified by a number, a special arrangement can be made for billing the message: the field of the UCP frame relating to the sender is completed with the sender's number in alphanumeric type. The SMS-C recognizes that the sender field is of the alphanumeric type and generates a traffic record (subsequently sent to the billing systems) showing as sender the recipient's number, instead of the sender's number, and therefore enables the appropriate billing policies to be used.

To encode a string as an alphanumeric OAdC field (the sender of the short message), the following steps may be carried out:
1) The string is encoded in the 7-bit GSM alphabet (for example as shown in table in GSM 03.38 or EMI specifications).
2) The "SMS Point-to-Point Packing" compression algorithm (described in the GSM 03.38 specifications) is applied to the result of the encoding.

3) The number of half-octets produced by the compression algorithm is then placed at the head of the resulting string.
4) The resulting string is finally converted to the alphanumeric representation which the UCP protocol will use for the messages.

ADVANTAGES AND POSSIBLE APPLICATIONS OF THE INVENTION

I—Short Message Debiting Options

Three different options are herein disclosed to determine the modes in which a user can authorize other users to debit short messages to his number:
1. Unlimited: a number configured with this option can debit an unlimited number of messages to the recipient.
2. Numeric: a number configured with this option can debit a maximum number N of messages, determined by the recipient. The number N set initially is decremented on the transit of each short message and, when the value reaches zero, the platform sends a courtesy message to the sender, notifying him that short messages cannot be sent with debiting to the recipient.
3. Time-based: a number configured with this option can debit an unlimited number of messages within a time interval specified by the recipient. If the configured number sends a short message with debiting to the recipient outside the entered time interval, it will receive a courtesy message notifying it that the message cannot be resent.

II—Web Management Interface

Easier access for the user can be provided by using the World-Wide Web and corresponding browsers.

A web interface enables the users to manage the lists of numbers authorized for debiting. The allowed operations may be, for example:
1. Display of the list of authorized numbers.
2. Addition of a new number to the list in one of the following modes:
   a. Unlimited authorization
   b. Numeric authorization
   c. Time-based authorization
2. Activation/Disabling of a number already present on the list.
3. Modification of the entries of numbers present on the list.
4. Removal of a number from the list.

III—Service by Short Message

Access via mobile telephone may be also provided. For example, the users can interact with the platform which manages the service by sending special service SMs containing a special keyword. Most typical operations may include:
1. Entry of a New Number Authorized for Debiting in Unlimited, Numeric or Time-Based Mode.

A user wishing to authorize a new number for debiting may send a short message showing 4888<number to be activated> as the recipient, and insert the keyword for this option into the message. A further keyword may also be introduced, in order to specify the authorization mode. For example, if a number is inserted into the text in addition to the keyword, the authorization will be of the numeric type; otherwise it will be of the unlimited type. If the number that the user wishes to activate is already authorized, the existing entry may be overwritten with the new request.
2. Removal of a Number Authorized for Debiting from the List.

A user wishing to remove a number authorized for debiting from the list must send a short message showing 4888<number to be disabled> as the recipient, and insert the keyword for this option into the message.

3. Display of the List of Numbers

The user can receive information on the list of numbers which he has configured, by sending a short message to a service number, such as for example 48883, or, as another example, to the number 4888<own number>, as the recipient, and inserting the keyword for this option into the message.
4. Request for Help The user can send a help request message enabling him to receive a courtesy message containing the instructions for using the service by short messages.

Provision may be also made for billing for the various operations associated with the activation, cancellation, status request or the service management in general. For this purpose, each request may be answered with a courtesy message in which the UCP OADC field (sender of the SMS) is set, together with a short number associated with the billing which is to be applied for the specific service message. For this type of message, the sender field is not put in alphanumeric format; instead, the ordinary numeric format can be used (leaving the UCP OTOA field empty).

The keywords, the courtesy messages and the billing short numbers to be used for the service short messages can be determined from a configuration file of the platform.

The invention claimed is:

1. A method for sending short messages using a debiting service with debiting to a recipient, comprising:
   (i) receiving, at a short message service center, a short message and a number associated with the recipient of the short message, the number comprising a recipient's number with the addition of a prefix, the prefix being associated with said debiting service;
   (ii) forwarding the short message from the short message service center to a platform managing the debiting service based on said prefix;
   (iii) checking an authorization of a sending number to debit a cost of the short message to the recipient;
   (iv) checking if a credit of the recipient is greater than said cost; and
   (v) if outcomes of both checks iii and iv are positive, sending the short message to the recipient.

2. The method of claim 1, further comprising:
   (i) if at least one outcome of checks iii and iv is negative, sending a courtesy message to a sender of said short message, informing him that the debiting service is not possible.

3. The method of claim 1 or 2, wherein checking an authorization of a sending number comprises checking if a maximum number of allowed short message to be debited is greater than zero.

4. The method of claim 2, wherein checking an authorization of a sending number comprises checking if a maximum number of allowed short message to be debited is greater than zero and decrementing said maximum number by one if outcomes of both checks iii and iv are positive.

5. The method of claim 1 or 2, wherein checking an authorization of a sending number comprises checking if a sending time of said short message is within a predetermined time interval.

6. The method of claim 1, wherein decrementing said credit by said cost if outcomes of both checks iii and iv are positive.

7. The method of claim 1, wherein checking an authorization of a sending number is carried out by checking a list of authorized numbers.

8. The method of claim 7, further comprising:
allowing said recipient to display or update said list of authorized numbers.

9. The method of claim 1, wherein checking an authorization of a sending number comprises checking if a maximum number of allowed short message to be debited is greater than zero and decrementing said maximum number by one if outcomes of both checks iii and iv are positive.

* * * * *